United States Patent

Miller

[15] 3,673,203
[45] June 27, 1972

[54] 1,2,4-THIADIAZOLYL UREAS
[72] Inventor: Alfred H. Miller, Somerset, N.J.
[73] Assignee: Esso Research and Engineering Company
[22] Filed: Oct. 22, 1969
[21] Appl. No.: 870,475

[52] U.S. Cl. .........................................260/306.8 D, 71/90
[51] Int. Cl. ..........................................................C07d 91/60
[58] Field of Search ...........................................260/306.8 D

[56] References Cited

FOREIGN PATENTS OR APPLICATIONS 6,805,646  2/1969  Republic of South Africa

OTHER PUBLICATIONS

Metzger et al., Chem. Abstracts, 72:79060n (1970).

Primary Examiner—Alex Mazel
Assistant Examiner—R. J. Gallagher
Attorney—Chasan and Sinnock and John Paul Corcoran

[57] ABSTRACT

Ureas containing the 1,2,4-thiadiazolyl group and represented by the following structural formula have been found to possess utility as novel selective herbicides.

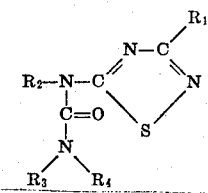

wherein $R_1$ is $C_4$—$C_8$ alkyl ro $C_7$—$C_8$ cycloalkyl; $R_2$ is H, methyl or ethyl; $R_3$ and $R_4$ are H or methyl or methoxy.

5 Claims, No Drawings

1,2,4-THIADIAZOLYL UREAS

This invention relates to novel herbicidal compositions. In one aspect, this invention relates to specific 1,2,4-thiadiazolyl ureas. In another aspect, this invention relates to the use of these specific 1,2,4-thiadiazolyl ureas as selective herbicides.

It is known that thiazolyl ureas, such as N-(4-methyl-1-3-thiazolyl-2)-N'-methyl urea have utility as herbicides.

Recently, the Farbenfabriken Bayer Aktiengesellschaft Company has published a patent application in the Republic of South Africa Pat. No. 685,646 which describes new 1,2,4-thiadiazolyl ureas having the formula:

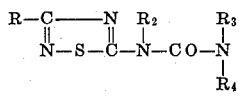

in which R is an alkyl, cycloalkyl, alkylmercapto, arylalkyl or dialkylamino radical, or is an aryl radical (which may be substituted by chlorine and/or nitro); $R_2$ is hydrogen or an alkyl hydroxy alkyl or alkoxy radical; $R_3$ is hydrogen or an alkyl radical with one to four carbon atoms and $R_4$ is an alkyl or alkoxy radical.

This patent discloses these compounds as having strong herbicidal properties. The present invention relates to a specific group of 1,2,4-thiadiazolyl ureas having the above generic formula but exhibiting strong selective herbicidal properties not exhibited by all of the 1,2,4-thiadiazolyl ureas covered by the above generic formula.

It has been unexpectedly discovered that when R in the above formula contains an alkyl group of at least four carbon atoms, and less than nine carbon atoms, that these compounds are very selective in their herbicidal activities on a post-emergence basis. When this substituent group contains less than four carbons, the herbicide is such that it is not selective compared to the compounds claimed in this invention.

Briefly, the subject invention relates to those 1,2,4-thiadiazolyl ureas embraced by the following generic structure;

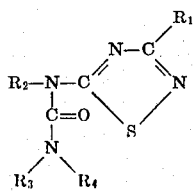

wherein $R_1$ is $C_4$-$C_8$ alkyl and $C_7$-$C_8$ cycloalkyl; $R_2$ is H, methyl, or ethyl; $R_3$ and $R_4$ are H or methyl.

One known method of preparing these compounds is by reacting a 5-amino-1,2,4-thiadiazole in the presence of a solvent with an isocyanate according to the following scheme:

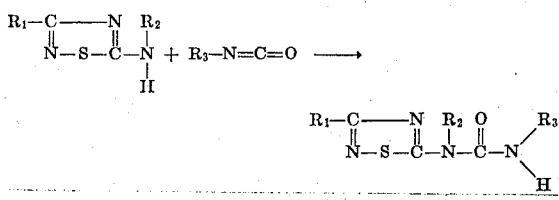

Another known method of preparing these compounds is made by reacting a 5-amino-1,2,4-thiadiazole in the presence of a solvent and an acid acceptor with an acid chloride according to the following schematic representation:

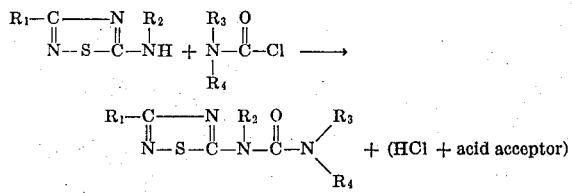

A still further method for making these compounds is by reacting a 5-amino-1,2,4-thiadiazole with phosgene to give the corresponding carbamolyl chloride after which the carbamolyl chloride is reacted with the appropriate amine to provide the thiadiazolyl urea, according to the following schematic representation:

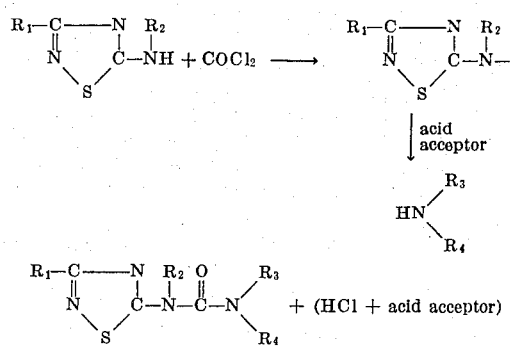

It is to be understood that $R_1$, $R_2$, $R_3$ and $R_4$ represented in these methods of preparation are defined as hereinabove.

The starting materials in all of these reactions are well known and are easily accessible to the public.

All inert organic solvents are suitable for the process variants. Preferred solvents include hydrocarbons such as benzene and toluene; ethers, such as diethyl ether, tetrahydrofuran and dioxane; ketones, such as acetone; esters, such as ethyl acetate; amines, such as pyridine; and triethylamine polar solvents, such as dimethylformamide and acetonitrile.

In those reactions wherein a free acid is released, it is preferred to include an acid acceptor. Preferred ones include alkali metal hydroxide, such as sodium hydroxide, potassium hydroxide, as well as alkali metal carbonates, such as potassium carbonate. Particularly suitable are tertiary amines, such as pyridine and triethylamine. When a tertiary amine is used as the solvent, then it also functions as the acid acceptor.

The reaction temperatures can be varied within a fairly wide range. In general, these reactions are carried out at a temperature ranging from 0° to 90° C., and preferably from 50° to 80° C.

When carrying out the process of the invention, equimolar amounts of starting materials are preferred. The reactions are normally carried out under ambient pressures and there is no real advantage in working at high pressures.

The specific 1,2,4-thiadiazolyl ureas of this invention influence plant growth and can, therefore, be used as defoliating agents and weed killers to facilitate harvest. They are, however, quite particularly suitable for the selective control of weeds and by weeds is meant all plants which grow in places where they are not desired.

The novel compounds can be employed, for example, in the case of the following plants where they demonstrate a selective herbicidal activity: Barnyard grass, crabgrass, yellow foxtail, zinnia, mustard grass, morning glory, cotton, soybeans, alfalfa, corn, rice and oats.

The active compounds according to the present invention can be converted into the usual formulations, such as solutions, emulsions, suspensions, powders, pastes and granulates. These may be produced in known manner, for example, by mixing the active compounds with inert extenders; that is, liquid or solid diluents or carriers, optionally with the use of surface active agents; that is, emulsifying agents or dispersing agents. In the case of use of water as an extender, organic solvents can, for example, also be used as auxiliary solvents.

As liquid diluents are carriers, they are preferably used aromatic hydrocarbons, such as cylenes or benzenes, chlorinated aromatic hydrocarbons, such as chlorobenzenes, paraffins, such as mineral oil fractions, alcohols, such as methanol or butanol or strongly polar solvents, such as dimethylformamide or dimethyl sulfoxide, as well as water.

Solid diluents for carriers which are preferably used include naturally occurring substances, such as kaolin, clays, talc, or chalk, or ground synthetic materials, such as highly dispersed silicic acid or silicates.

Preferred examples of emulsified agents include nonionic and anionic emulsifiers, such as polyoxyethylene fatty acid esters, polyoxyethylene fatty alcohol esters, for example, alkyl aryl polyglycol ethers, alkyl sulfonates and aryl sulfonates and preferred examples of dispersing agents, including lignin, sulfite waste liquors and methyl cellulose.

When the herbicidally active ingredient is applied as an aqueous emulsion, the emulsifier used preferably comprises an essentially aromatic, phytotoxic, hydrocarbon carrier or a mixture of aromatic hydrocarbons in such a carrier, such as: naphtha (boiling range of about 90° to 100° C.); petroleum fractions such as kerosene, diesel oil, and the like; straight run mineral spirits, such as Varsol (boiling range of about 150° to 250° C.), and preferably aromatic hydrocarbons such as toluene, xylene and the like, preferably heavy aromatic naphthas (boiling range of 150° to 300° C.). The invention also contemplates the use of phytotoxic, oxygenated solvents, such as tetrahydrofuran, dioxane, ethylene glycol, mono and diethers, alcohols, ketones, esters, and the like.

By the terminology "phytotoxic solvent" is meant a solvent having phytotoxic or injurious effects upon plants. While it is not desired or intended to limit the scope of this invention by any theory, the following discussion concerning the mechanism by which phytotoxicity is believed to be effected on plants is included so as to afford additional emphasis upon the nature of the solvent employed in this invention.

Phytotoxicity by solvents is believed caused by denaturization of the plasma membranes of plant cells resulting from solubilization of such membranes by the solvent. The phytotoxic response results from partition of the solvent into the membrane, thereby causing a greatly increased permeability followed by leakage of cell sap into the intercellular spaces of the leaves and consequent death of the cells.

The degree of phytotoxicity of a given solvent is therefore dependent upon its effectiveness as a solvent for the leaf cuticle and its ability to partition into the leaf membrane. Accordingly, the property of solvent phytotoxicity will vary with the inherent nature of its solvency toward leaf cuticle, and thus will vary in accordance with the nature of the given solvent. For example, solvents such as methanol or acetone, etc., although generally poor solvents for leaf cuticle, may nevertheless be phytotoxic if used in sufficient quantity. On the other hand, solvents such as aromatic hydrocarbons, glycol ethers or their acetates, etc., which are known to have a high degree of solvency for leaf cuticle, are much more phytotoxic at lower use or dosage levels. With respect to the aromatic character or content of aromatic hydrocarbons, it is ordinarily and generally accepted that such aromatic content must be greater than about 25 percent in order for such hydrocarbons to be effective phytotoxic solvents at the low dosage levels of conventional practice. In the preferred embodiment of this invention, therefore, the preferred phytotoxic solvents intended for use, such as, e.g. heavy aromatic naphtha, must be utilized in a manner such that the weight ratio of solvent to active ingredient in the final herbicide composition or formulation is within the range from about 0.2 to about 4, preferably from about 0.4 to about 2.

The agricultural herbicide compositions of this invention are ordinarily prepared or formulated in the form of emulsifiable concentrates containing from about 30 to about 75 wt. percent or higher of the active ingredient (or ingredients if mixtures are used), from about 20 to about 60 wt. percent of the solvent, e.g. a hydrocarbon solvent, and from about 5 to about 10 wt. percent of hydrocarbon soluble emulsifying agent. These concentrates can be diluted in the field with water or another suitable solvent or diluent material so that the emulsifiable concentrate constitutes from about 10 to about 70 vol. percent of the total aqueous emulsion formulation and provides at least about 10 wt. percent of the 1,2,4-thiadiazolyl ureas.

The term "emulsifying agent" as used herein shall be understood to connote generically the various emulsifying agents and the like that are adapted to be admixed with the active ingredient and hydrocarbon solvent of this invention in order to effect the formation of stable emulsion when the emulsifiable concentrate is diluted with water. Other surfactants, such as wetting agents, or "spreading-sticking" compounds, which "-spreading-sticking" compounds are combinations of surfactants and hydrophylic materials, usually polymers, e.g. polyvinylalcohol, which are said to enhance the persistence of the active ingredient on the crop or foliage of the crop and aid in the penetration of the active ingredient into the plant, can also be included into the emulsifiable concentrate or into the water for dilution of the emulsifiable concentrate.

Among the hydrocarbon-soluble emulsifying agents that may be suitably employed are the alkali metal salts of sulfates of long, straight or branched chain alcohols such as dodecanol up to octadecanol, sulfonated amide and ester derivatives, sulfonated aromatic and mixed alkyl-aryl sulfonated derivatives, esters of fatty acids such as ricinoleic acid, the esters of sorbitol, salts of the petroleum sulfonic acids, the alkali metal salts of the last-named being preferred.

The non-ionic emulsifying agents, such as the ethylene oxide condensation products of alkylated phenol, alcohols, or amines may also be used. In addition, blends of the foregoing can be utilized in the present invention. Exemplary of such non-ionic emulsifiers include Sponto 55, a blend of alkylphenol polyoxyethylene ethers plus sulfonates; Surfonic N–95, a nonyl phenol 9.5 mole ethylene oxide adduct; Triton X–151, a blend of alkylaryl polyether alcohols with organic sulfonates, and others such as Sponto 33; Triton X–161, X–171, X–152; etc.

The aqueous emulsion is applied to the plants or given crops at a rate of 2 to about 25 gallons per acre, preferably 5 to about 15 gallons per acre, with conventional ground spray equipment.

When the active ingredient is applied as an aqueous emulsion, it is diluted with sufficient water to apply it in a volume of from about 2 to about 20 gallons per acre, preferably from about 5 to about 15 gallons per acre and to provide at least about 10 wt. percent of the 1,2,4-thiadiazolyl ureas utilized.

When the active ingredient is applied in a hydrocarbon solution, the final agricultural composition preferably consists essentially of the active ingredient in an aromatic hydrocarbon carrier such as naphtha, preferably a heavy aromatic naphtha (boiling point range: 150° to 300° C.); petroleum fractions such as kerosene, diesel oil, and the like; straight run mineral spirits, such as Varsol; and essentially aromatic hydrocarbons such as toluene, xylene, and the like. The other similarly inert solvents previously described are also useable, individually, or in admixture with each other and their formulations are prepared and used in accordance with the general procedures previously described.

In the instance where the branched, aliphatic carboxylic acids of this invention are solids, as e.g. the higher molecular weight acids, they are generally, or substantially, insoluble in the solvents used herein and therefore require the use of a cosolvent to enable their effective utilization. The quantity of cosolvent that would be used, in such event, would be in the range of about 2–10 percent, preferably about 5 percent.

A general procedure by which these 1,2,4-thiadiazolyl ureas would be rendered suitable for commercial use is as follows: Ordinarily, the 1,2,4-thiadiazolyl ureas, emulsifier, and conventional solvent are mixed in a vessel in proportions previously described above, together with the cosolvent. The sequence of addition is not critical provided that adequate mixing occurs to effect solution of all components.

In a preferred embodiment wherein a cosolvent is used in the foregoing manner, about 50 to about 70 wt. percent of the solid 1,2,4-thiadiazolyl ureas, about 15 to about 43 wt. percent heavy aromatic naphtha, about 5 wt. percent Sponto 55 emulsifier, and about 2 to about 10 wt. percent methanol were mixed together.

Cosolvents suitable for use in this invention include those having a dielectric constant greater than about 6. Exemplary of such cosolvents include: lower $C_1$ to $C_5$ alcohols, such as methanol, ethanol, isopropyl alcohol, etc.; sulfoxides of the formula $R_2SO$, where R is a $C_1$ to $C_4$ aliphatic group, preferably dimethyl sulfoxide; glycols, such as ethylene glycol, propylene glycol, etc.; glycol ethers, such as ethylene glycol dimethyl ether, ethylene glycol diethyl ether, diethylene glycol dialkyl ethers, etc.

The agricultural, herbicidal compositions or formulations of this invention, their evaluation as herbicides, and their methods of preparation are further illustrated in the following examples but it is to be understood that they should not be construed as limiting the invention in any manner whatsoever.

EXAMPLE 1

To 70 g (0.41 moles) 3-pentyl-5-amino-1,2,4thiadiazole in 150 ml of benzene, there is added dropwise at 25° C. with stirring 25.7 g (0.45 moles) of methyl isocyanate. The temperature is kept at 65°–75° C. for 2 hours, then the solvent is removed in a vacuum. After recrystallization of the solid residue from benzene followed by ethyl alcohol, the N'(3-pentyl-1,2,4-thiadiazolyl-N-methyl urea is obtained in crystalline form. Compounds prepared via this procedure are listed in Table I.

TABLE I

| Compound | $R_1$ | $R_2$ | $R_3$ | $R_4$ | M.p. or analysis |
|---|---|---|---|---|---|
| 1 | $C_3H_7$ | $CH_3$ | H | $CH_3$ | 125° C. |
| 2 | $iC_3H_7$ | $CH_3$ | H | $CH_3$ | 148° C. |
| 4 | $C_3H_7$ | H | H | $CH_3$ | 203° C. |
| 5 | $\phi$ | $CH_3$ | H | $CH_3$ | 187° C. |
| 6 | $C_4H_9$ | H | H | $CH_3$ | 192° C. |
| 11 | $C_8H_{17}$ | $C_2H_5$ | H | $CH_3$ | 64° C. |
| 12 | $C_8H_{17}$ | $CH_3$ | H | $CH_3$ | C=52.9, H=8.2, N=19.6. |
| 13 | $C_8H_{17}$ | H | H | $CH_3$ | 152° C. |
| 14 | $C_5H_{11}$ | H | H | $CH_3$ | 188° C. |
| 7 | $iC_5H_{11}$ | H | H | $CH_3$ | 192–194 |

EXAMPLE 2

3.5 g 3-n-pentyl-5-methylamino-1,2,4-thiadiazolyl in 50 ml. benzene saturated with phosgene was heated at reflux for 1 hour. The resulting clear solution was then rapidly concentrated to a small volume. The crude carbamolyl chloride was dissolved in 50 ml benzene, then treated with a benzene solution of O,N-dimethylhydroxylamine. The solution was stirred overnight at room temperature. Work up gave the N,N'-dimethyl-N'-methoxy-N' (3-N-pentyl 1,2,4-thiadiazolyl) urea in crystalline form.

Compounds prepared via this procedure are listed in Table II.

TABLE II

| Compound | $R_1$ | $R_2$ | $R_3$ | $R_4$ | M.p. or analysis |
|---|---|---|---|---|---|
| 3 | $iC_3H_7$ | $CH_3$ | $CH_3$ | $CH_3$ | 51. |
| 8 | $C_5H_{11}$ | $CH_3$ | $OCH_3$ | $CH_3$ | 34. |
| 9 | $C_8H_{17}$ | $C_2H_5$ | $CH_3$ | $CH_3$ | Oil, C=58.5, N=17.5, H=9.1. |
| 10 | $C_8H_{17}$ | $C_2H_5$ | $OCH_3$ | $CH_3$ | 41. |

EXAMPLE 3

2.0 g (0.01 mole) 3-n-pentyl-5-amino-1,2,4-thiadiazole in 50 ml pyridine was treated with a solution of 5 g N,N-dimethyl carbamolyl chloride in 50 ml pyridine. After standing at room temperature for one-half hour, the solution was heated for 2 hours at 70° C. The reaction solution was poured into dilute hydrochloric acid and the product extracted with ether. The N,N-dimethyl-N'(3-n-pentyl-1,2,4thiadiazolyl) urea was isolated as a yellow oil. C   48.7, H   7.30, N   22.9

The compounds made in Examples 1–3 were then tested for their selective herbicidal activity.

The following screening procedures were employed for testing:

SCREENING PROCEDURES

HERBICIDES

Pre-Emergence

Step 1: Two flats seeded with six crops (cotton, soybean, alfalfa, corn, rice, Johnson and six weeds (mustard, morning glory, velvet leaf, crabgrass, Johsnon grass, foxtail) are sprayed on a pre-emergence basis with a formulation containing chemical at a rate equivalent to 10 lbs./acre. The flats are then held in the greenhouse and the response rated after 12-16 days. Response is rated on a scale of 0–10, where 0= no injury and 10= complete kill. Standard herbicides used as a standard in pre-emergence tests. Step 2: Same as above except that effective compounds are evaluated in dosage series at 5, 2.5, 1.25 and 0.6 lbs./acre.

Post-Emergence

Step 1: Flats are seeded as above and held on a post-emergence basis until the first true leaves have appeared on all plants when they are sprayed in the same fashion as above at a rate of 10 lbs./acre. The plant responses are rated 12–16 days after treatment on the same scale as above and are diluted by the same criterion.

Step 2: The same as in the pre-emergence evaluation.

TABLE III.—POST-EMERGENCE TESTS

| Active compound | Active compounds applied lbs./acre | Barnyard grass | Crab-grass | Yellow foxtail | Zinnia | Mustard | Morning glory | Cotton | Soybean | Alfalfa | Corn | Rice | Oats |
|---|---|---|---|---|---|---|---|---|---|---|---|---|---|
| (1) [structure: thiadiazole with $C_3H_7$, $CH_3-N-C$, $C=O$, $CH_3-NH$, "Known"] | 10 | | 10 | 10 | | 10 | 10 | 10 | 10 | | 9 | 8 | 10 |
| (2) [structure: thiadiazole with $CH(CH_3)_2$, $CH_3-N-C$, $C=O$, $CH_3-NH$, "Known"] | 10 | | 10 | 10 | | 10 | 10 | 10 | 10 | | 10 | 9 | 10 |

Table III—Continued

| Active compound | Active compounds applied lbs./acre | Barnyard grass | Crab-grass | Yellow foxtail | Zinnia | Mustard | Morning glory | Cotton | Soybean | Alfalfa | Corn | Rice | Oats |
|---|---|---|---|---|---|---|---|---|---|---|---|---|---|
| (3) [structure with CH(CH3)2 group] Known | 10 | — | 9 | 9 | — | 10 | 10 | 10 | 10 | — | 8 | 2 | 9 |
| (4) [structure with CH2CH2CH3] Known | 10 | — | 6 | 10 | — | 10 | 10 | 10 | 10 | — | 10 | 2 | 9 |
| (5) [structure with φ] Known | 10 | — | 8 | 10 | — | 10 | 10 | 9 | 9 | — | 8 | 3 | 9 |
| (6) [structure with C4H9] | 10 | 9 | 10 | 10 | 10 | 10 | 10 | 1 | 10 | 10 | 3 | 8 | 9 |
| (7) [structure with C5H11] | 10 | 10 | 10 | 10 | 10 | 10 | 10 | 10 | 10 | 2 | 2 | 5 | 8 |
| (8) [structure with C5H11] | 10 | 9 | 9 | 9 | 10 | 10 | 7 | 3 | 8 | 2 | 3 | 2 | 2 |
| (9) [structure with C8H17] | 10 | 9 | 8 | 9 | 10 | 9 | 8 | 3 | 6 | 9 | 1 | 4 | 5 |
| (10) [structure with C8H17] | 10 | 9 | 9 | 8 | 10 | 10 | 3 | 2 | 5 | 6 | 1 | 1 | 4 |
| (11) [structure with C8H17] | 10 | 9 | 10 | 10 | 10 | 10 | 9 | 5 | 7 | 4 | 9 | 9 | 6 |

Table III—Continued

| Active compound | Active compounds applied lbs./acre | Barn-yard grass | Crab-grass | Yellow fox-tail | Zin-nia | Mus-tard | Morning glory | Cot-ton | Soy-bean | Alfalfa | Corn | Rice | Oats |
|---|---|---|---|---|---|---|---|---|---|---|---|---|---|
| (12)  | 10 | 9 | 10 | 9 | 10 | 10 | 6 | 0 | 3 | 0 | 0 | 0 | 0 |
| (13)  | 10 | 0 | 6 | 3 | 6 | 6 | 7 | 0 | 3 | 0 | 0 | 0 | 0 |
| (14)  | 10 | 9 | 9 | 10 | 10 | 10 | 10 | 10 | 10 | 10 | 2 | 6 | 5 |
| (7)  | 10 | 10 | 10 | 10 | 10 | 10 | 10 | 10 | 10 | 10 | 6 | 8 | 7 |
| | 0.63 | 10 | 10 | 9 | 10 | 10 | 10 | 2 | 4 | 8 | 2 | 2 | 2 |

TABLE IV.—PRE-EMERGENCE TEST

| Active compound | Active compound applied lbs./acre | Barn-yard grass | Crab-grass | Yellow fox-tail | Zin-nia | Mus-tard | Morning glory | Cot-ton | Soy-bean | Al-falfa | Corn | Rice | Oats |
|---|---|---|---|---|---|---|---|---|---|---|---|---|---|
| (7)  | 10 | 8 | 9 | 9 | 9 | 10 | 10 | 2 | 2 | 10 | 0 | 0 | 0 |

By comparing the above data, it becomes evident that by maintaining the number of carbon atoms in the $R_1$ substituent in the range of $C_4$ to $C_8$, it is possible to have herbicides which selectively remove weeds from growing crops on a post-emergence herbicide basis.

What is claimed is:

1. 1,2,4-thiadiazolyl ureas of the formula:

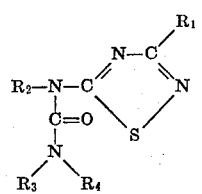

wherein $R_1$ is $C_4$—$C_8$ alkyl and/or $C_7$—$C_8$ cycloalkyl; $R_2$ is H, methyl or ethyl; $R_3$ and $R_4$ can be the same or different and each can be selected from the group consisting of hydrogen, methyl and methoxy.

2. A compound according to claim 1 having the structure:

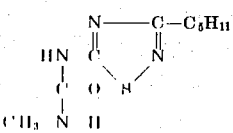

3. A compound according to claim 1 having the structure:

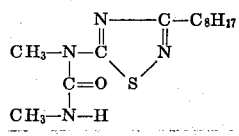

4. A compound according to claim 1 having the structure:

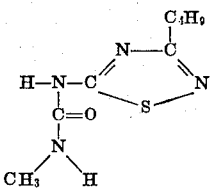

5. A compound according to claim 1 having the structure:

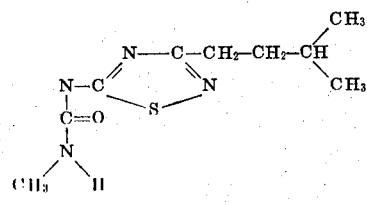

* * * * *